United States Patent [19]

Gmeiner et al.

[11] Patent Number: 4,469,444

[45] Date of Patent: Sep. 4, 1984

[54] MIXING AND DEGASSING APPARATUS FOR VISCOUS SUBSTANCES

[75] Inventors: Paul Gmeiner, Lieli; Gustav Oesch, Zurich, both of Switzerland

[73] Assignee: Micafil AG, Zurich, Switzerland

[21] Appl. No.: 513,906

[22] Filed: Jul. 14, 1983

[30] Foreign Application Priority Data

Jul. 21, 1982 [CH] Switzerland .......................... 4438/82

[51] Int. Cl.³ ............................................. B01F 15/06
[52] U.S. Cl. .................................... 366/144; 366/329; 55/199
[58] Field of Search ............... 366/144, 168, 329, 279, 366/244, 245; 55/199; 165/109 R

[56] References Cited

U.S. PATENT DOCUMENTS 3,229,449  1/1966  Hogue .................................... 55/193

FOREIGN PATENT DOCUMENTS 2445287  4/1976  Fed. Rep. of Germany .
3026493  2/1982  Fed. Rep. of Germany .

Primary Examiner—Philip R. Coe
Assistant Examiner—Frankie L. Stinson
Attorney, Agent, or Firm—Burns, Doane, Swecker & Mathis

[57] ABSTRACT

A mixing and degassing apparatus for viscous substances is provided with a distributor plate located above heat exchanger coils and joined for rotation with an agitator shaft. The distributor plate has the configuration of a truncated cone. The distributor plate can be of a single piece or step-like with at least one step. Its circumference is provided with recesses to provide sections having different radii. The sections with the larger radius extend to near the inner surface of a vessel wall and the sections with the smaller radius terminate above the coils. In the case of the step-like distributor piece, thin layers of the insulating material overlap between each step in the area of partitions, while simultaneously being effectively degassed.

6 Claims, 4 Drawing Figures

MIXING AND DEGASSING APPARATUS FOR VISCOUS SUBSTANCES

BACKGROUND OF THE INVENTION

The present invention concerns a mixing and degassing apparatus for viscous substances of the type essentially comprising a vessel equipped with an agitator and provided with temperature controls, measuring elements and controls, together with an inlet line and a discharge pipe. It is particularly designed for multiple component synthetic resin insulating materials for electric insulation.

It is customary in insulating installations to use a mixing and degassing vessel equipped with a conventional agitator, for example a plate mixer, wherein an impregnating material is mixed and degassed when the agitator is operating. However, for viscous substances, for example synthetic resins, this arrangement is less suitable if rapid degassing of the impregnating materials is to be obtained.

In encapsulating installations, where more highly viscous substances are used than in impregnating, various proposed solutions have been attempted to obtain accelerated degassing during the mixing process. For example, German Ausslegesohrift No. 2,417,137 discloses degassing with a feed screw arranged in the center of a vessel and surrounded at a slight distance by a guide tube having a run-off surface on top, wherein the conditions of flow between the lower end of the tube, the agitator blade and the bottom of the vessel are improved by supplemental measures. The mass of material conveyed to the top by the guide tube is spread in a thin layer over the run-off surface and then runs off in a downward direction. These measures effect an improvement of the mixing process, but in view of the short reaction time of these substances, degassing of highly viscous substances is often incomplete and therefore unsatisfactory.

OBJECT AND BRIEF STATEMENT OF THE INVENTION

It is the object of the present invention to provide a novel mixing and degassing apparatus, whereby a more adequately controlled distribution of viscous substances, such as resins, lacquers and the like, is assured and which together with optimum temperature regulation renders possible rapid cooling/heating of the substances and thus an accelerated and continuous degassing of all of the material within the shortest possible period of time.

In accordance with the present invention, this object is achieved by providing a distributor device above heating/cooling coils within a mixing vessel. This distributor device rotates with an agitator and is so arranged that it extends to the inner surface of the vessel wall and terminates in certain portions over the heating/cooling coils. In a preferred embodiment of the invention, the distributor device is in the configuration of a truncated cone whose outer periphery has recesses, so that some portions of this periphery are disposed adjacent the inner wall of the vessel while the recessed portions terminate above the coils. The surface of the distributor can be smooth, ribbed, curved or corrugated.

In accordance with another feature of the invention, the distributor plate can have one or more stepped portions, and these portions can be divided by radial partitions that terminate at a circumferential collar with appropriate passages being provided between the partitions.

In another embodiment of the invention, the distributor device can comprise distributor pipes joined for rotation with the agitating mechanism. One of these pipes extends adjacent to the inner surface of the vessel, while another pipe of shorter length terminates above the heating/cooling coils.

Advantages of the invention reside in the fact that both the heating/cooling coils present in the mixing and degassing installation and the internal surface of the vessel wall are utilized for thin layer degassing that is especially effective for viscous substances. If a single part or step-like distributor plate is used, additional degassing takes place over the surface of this distributor plate.

The invention will be further described with reference to specific embodiments shown in a simplified manner in the drawings.

DESCRIPTION OF PREFERRED EMBODIMENTS

Figure 1:
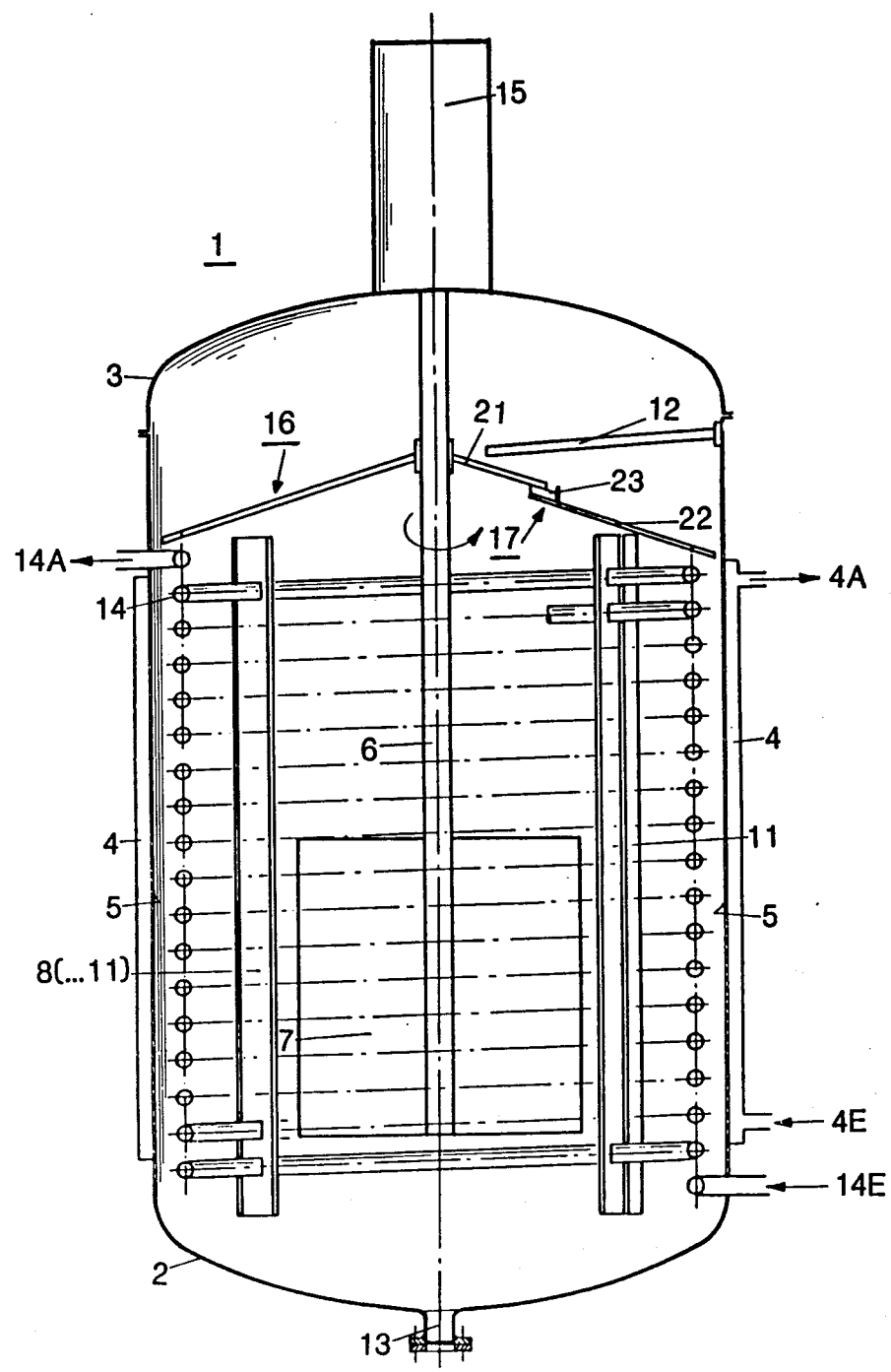
FIG. 1 is a cross sectional view of a first embodiment of a mixing and degassing apparatus incorporating the invention; with a single part configuration for the distributor plate being shown on the left side and a step-like configuration of the distributor plate being shown on the right side of the Figure.

Referring to FIG. 1, a mixing and degassing apparatus 1 consists of a vessel bottom 2, a vessel cover 3, a heated and cooled vessel jacket 4 with inlet orifices 4E and outlet 4A orifices for a heating and cooling medium. An agitator 6–11 driven by a drive 15 consists of an agitator shaft 6 with a plate mixer 7 and baffles 8–11. A further heating and cooling device is formed by circular coils 14 arranged vertically over one another at a distance from the internal surface 5 of the vessel jacket 4. The inlet and outlet for the cooling or heating medium are designated respectively by 14E and 14A.

Figure 2:
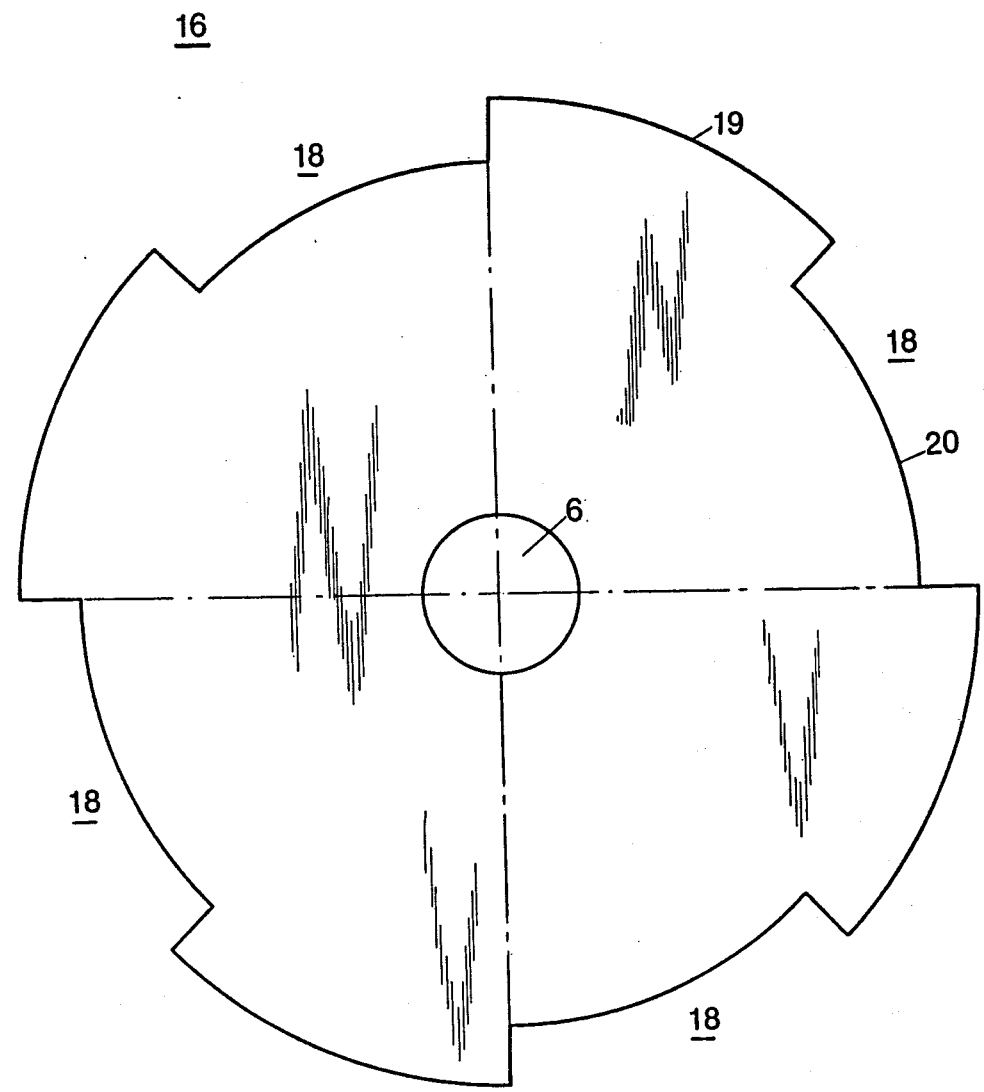
FIG. 2 is a plan view of the single part distributor plate shown in the left side of FIG. 1.

Each of a single part distributor plate 16, shown in detail in FIG. 2, and a step-like distributor plate 17 (illustrated in FIG. 3), have a configuration approximating a truncated cone. The surfaces of the plate may be smooth, ribbed, curved and/or corrugated. The distributor plate 16 or 17 is joined for rotation with the agitator shaft 6. A feed line 12 is provided above the distributor plate 16, 17 for the introduction of insulating material, for example a multicomponent synthetic resin insulating substance or an embedding mass. This feed line may be pivotable. A discharge pipe 13 is provided in the vessel bottom 2 for the further transport of the insulating material to impregnating or casting vessel (not shown).

FIG. 2 shows a single part distributor plate 16, the external circumference of which has reccesses 18 and consequently different radii, with the larger radius circumference 19 extending to near the internal surface 5 of the vessel wall and the smaller radius, recessed portions 20 terminating above the coils 14. The volume of insulating material flowing down over the internal surface 5 of the vessel wall and over the coils 14 can be regulated by means of interchangeable distributors 16 with recesses 18 of appropriate different sizes.

Figure 3:
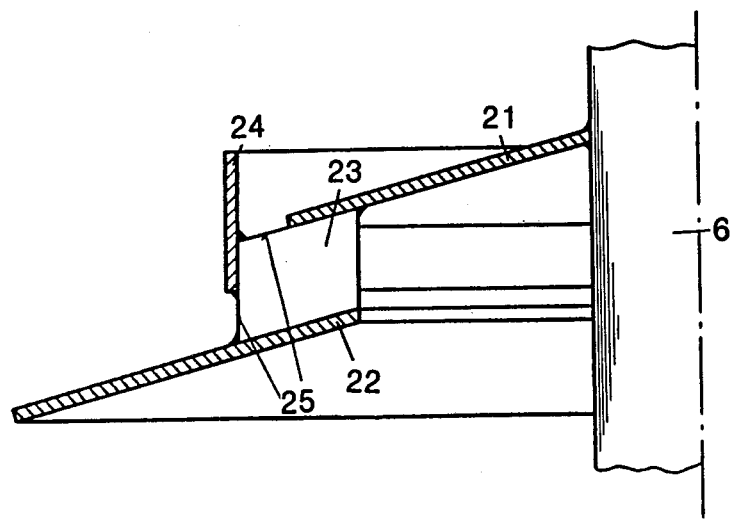
FIG. 3 is a cross section of the step-like distributor plate shown in the right side of FIG. 1.

FIG. 3 shows a step-like distributor plate 17, having for example two steps formed by overlapping parts 21, 22 of the plate, with radially arranged partitions 23 being provided between the steps 21/22, perpendicular to the surface of the plate. At a distance from the step 21/22, a collar 24 extending over the entire circumference is arranged so that between the first part 21 of the plate and the subsequent part 22, passages 25 are created on both sides of the partitions 23. Such configurations are obtained by welding the collar 24 to the front edges of the partitions 23, spaced apart both from the external periphery of the first part 21 of the plate and from the surface of the second part 22.

Figure 4:
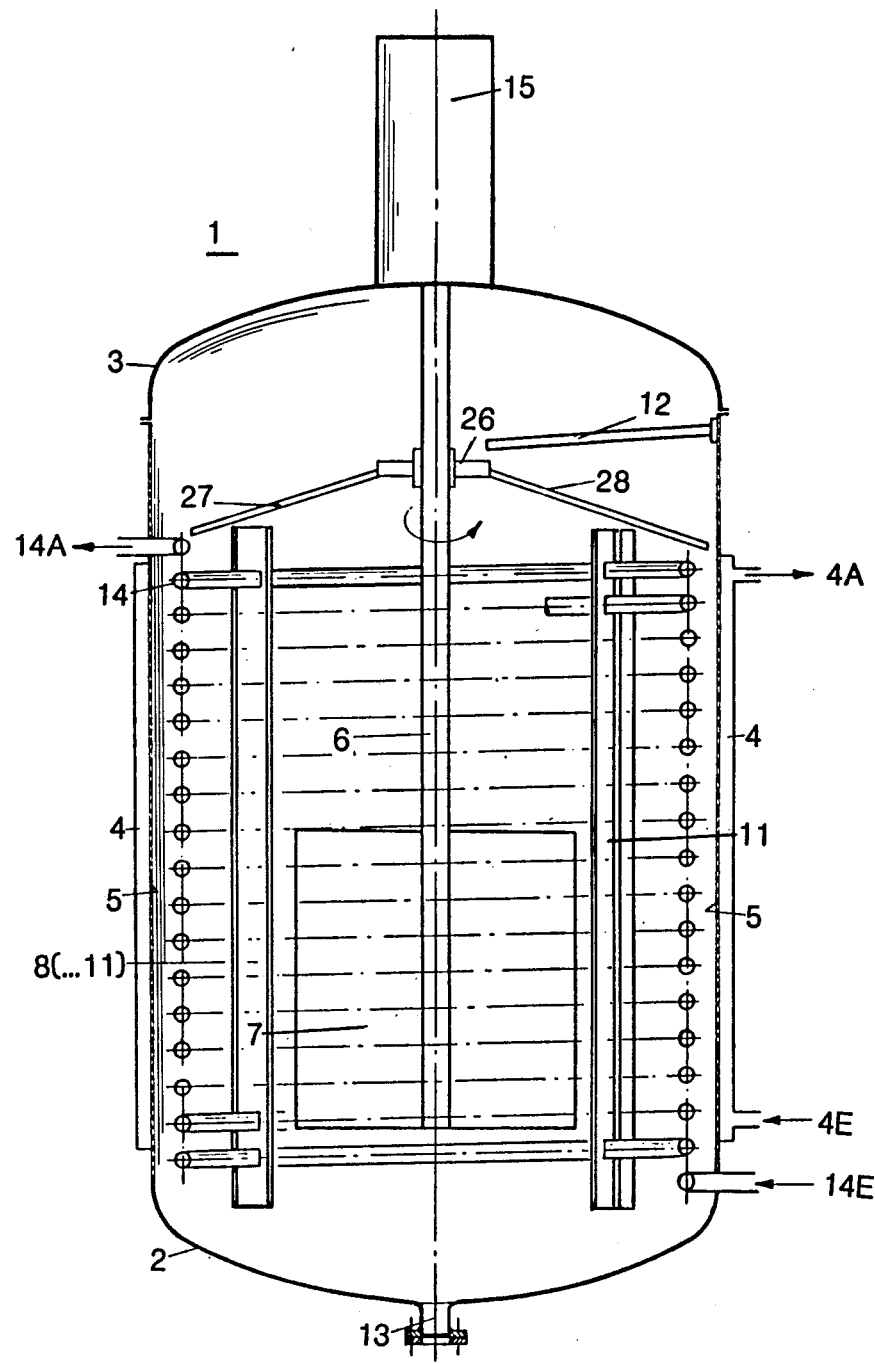
FIG. 4 is a cross sectional view of a second embodiment of the mixing and degassing apparatus.

The mixing and degassing apparatus 1 shown in FIG. 4 has a configuration similar to that of FIG. 1. However, in place of a single part or step-like distributor plate 16, 17, a distributor vessel 26 is provided, again joined for rotation with the agitator shaft 6. This vessel 26 is equipped with two distributor pipes 27, 28 of different lengths leading out of the vessel. The longer distributor pipe 28 extends close to the internal surface 5 of the vessel wall, and the shorter distributor pipe 27 terminates above the heating/cooling coils 14. The end of the feed line 12 is located above the distributor vessel 26, into which the insulating material is introduced.

A mixing and degassing apparatus implementing the invention operates as follows:

The installation is typically run intermittently, whereby the preprocessed insulating material or the embedding mass is transported in charges from the mixing and degassing apparatus 1 to the impregnating or casting vessel (not shown). Insulating materials of this type are stored in the mixing and degassing apparatus, depending on the life time/pot life of the substance, at a lower temperature of, for example, $-5°$ C. to $-10°$ C.

Prior to the impregnation itself, the impregnating material is heated in the mixing and degassing apparatus 1 to the temperature required by the particular type of resin, generally between 20° C. and 70° C. Following the evacuation of the vacuum/pressure-impregnating vessel (not shown) along with the material introduced into it, the impregnating substance processed in the mixing and degassing apparatus 1 is passed through the discharge pipe 13 into the impregnating vessel, where the material to be insulated, for example an electrical winding, is flooded and impregnated under vacuum. Subsequently, the vacuum is broken in a known manner, for example with an inert gas, preferably nitrogen, and the surface of the impregnating mass of the structural element is placed under pressure.

By means of the pressure, the excess impregnating substance is returned through a filter (not shown) over a line through the feed line 12 into the mixing and degassing apparatus 1 and flows in the vicinity of the agitator shaft 6 onto the distributor plate 16, for example. The rotating plate 16 makes possible the rapid, uniform distribution of the impregnating material in thin layers over the entire surface of the plate, whereby intensive thin layer surface degassing is assured. In the case of the distributor plate 16 according to FIG. 2, the impregnating material flows over the surface of this plate, both over the external periphery 19 with the larger radius onto the inner surface 5 of the vessel wall and over the external periphery 20 with the smaller radius onto the heating/cooling coils 14, progressing downwardly in thin layers, whereby a further effective thin layer degassing takes place. For certain applications, the distributor plate may be provided without recesses, in which case it would extend with its outer circumference either to the inner surface 5 of the vessel wall or terminate over the heating/cooling coils 14.

To prevent the flow of the impregnating material into the space between the coils 14 and the inner surface 5 of the vessel wall, the plate section between the smaller and larger external periphery can be bent slightly upward.

In the case of a step-like distributor plate 17 (FIG. 3), the thin layers of the impregnating material overlap at least in the area of a step 21/22. As the impregnating material flows over the first part 21 of the plate and over the edges of the partitions 23 to the collar 24 to the next part 22 of the plate, the layers of the impregnating material overlap in the passages 25, thereby assuring a further intensive degassing, which is especially effective for highly viscous substances.

In the second embodiment of the mixing and degassing apparatus shown in FIG. 4, the distribution of the impregnating material takes place by means of the distributor vessel 26 through at least two distributor pipes 27, 28 of different respective lengths, without a distributor plate 16, 17, directly to the inner surface 5 of the vessel wall and the heating/cooling coils 14, with the impregnating material flowing down in thin layers while undergoing effective degassing.

The principles, preferred embodiments and mode of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A mixing and degassing apparatus for viscous substances, comprising:
   a vessel having a discharge pipe;
   a rotatable agitator within said vessel;
   a temperature regulating system including heating-/cooling coils located within said vessel;
   a distributor device disposed above said coils within said vessel and joined for rotation with said agitator, said distributor device including a first portion which terminates adjacent to an inner wall of said vessel and a second portion which terminates over said coils; and
   means for feeding a viscous substance to said distributor device.

2. The apparatus of claim 1, wherein said distributor device comprises a plate in the configuration of a truncated cone and having recesses in the outer periphery thereof to provide sections of different radii, wherein the sections with the larger radius extends to near said inner wall of said vessel and the sections with the smaller radius terminate above said coils.

3. The apparatus of claim 2, wherein said distributor plate is comprised of a single sheet of material.

4. The apparatus of claim 2, wherein said distributor plate has at least one step along the radius thereof.

5. The apparatus of claim 4, wherein said distributor plate is comprised of at least two parts which overlap one another so as to form said step, and further includes radially disposed partitions arranged perpendicular to the surfaces of said parts, and a circumferential collar spaced from said two parts so as to provide passages between said partitions.

6. The apparatus of claim 1, wherein said distributor device comprises a distributor vessel which rotates with said agitator, and at least two pipes of different respective lengths extending from said distributor vessel, the longer one of said pipes extending to near said inner wall, and the shorter one of said pipes terminating above said coils.

* * * * *